April 21, 1942.  J. M. PETTEY  2,280,078
CLAMP FOR TUBING FLARING DEVICES
Filed March 13, 1940  2 Sheets-Sheet 1

INVENTOR
JAMES M. PETTEY
BY
HARRIS, KIECH, FOSTER & HARRIS

Fred A. Harris
FOR THE FIRM
ATTORNEYS

April 21, 1942.                J. M. PETTEY                    2,280,078
                       CLAMP FOR TUBING FLARING DEVICES
                         Filed March 13, 1940            2 Sheets-Sheet 2
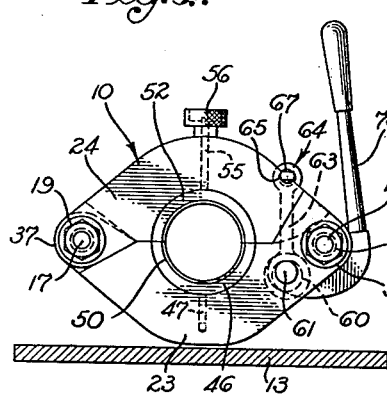
INVENTOR
JAMES M. PETTEY
BY
HARRIS, KIECH, FOSTER & HARRIS
ATTORNEYS Patented Apr. 21, 1942

2,280,078

UNITED STATES PATENT OFFICE 2,280,078

CLAMP FOR TUBING FLARING DEVICES

James M. Pettey, Los Angeles, Calif., assignor to Hughes Tool Company, Houston, Tex., a corporation of Delaware Application March 13, 1940, Serial No. 323,771

4 Claims. (Cl. 153—81)

My invention relates to the art of flanging cylindrical objects and more particularly is directed to an improved means for flaring the ends of tubing to prepare the tubing for cooperation with connectors and similar fittings. For the purpose of this disclosure I elect to describe a device built especially for flaring tubing employed in aircraft manufacture, but those skilled in the art will readily recognize that the principles may be readily applied to other devices for flaring tubes or tubing for other purposes.

The general object of my invention is to provide an efficient and rapid tubing flaring device that is flexible in the sense that it may be readily adapted to tubing over a wide range of diameters and over a wide range of wall thicknesses.

One of the necessary subcombinations of such a device is an arrangement for clamping or gripping a piece of tubing during the flaring operation. My object in this direction is to achieve an efficient and rapidly operable gripping means that will not mar or injure thin-walled tubing of relatively soft material. It is my further object in this regard to provide a convenient and efficient means to apply gripping force to the clamping arrangement, and in the preferred form of my invention I propose to include an adjustment means to compensate for wear on the working parts of the clamping arrangement to the end that the gripping efficiency may be maintained indefinitely.

To prepare a tubing end for adequate cooperation with a tubing fitting, for example, to cooperate with a tubing connector of the compression type, it is essential that the flared portion of the tubing be of uniform thickness and have a smooth finish. Thin-walled tubing of relatively soft material such as aluminum and copper alloys is exceedingly difficult to flare properly, especially if the tubing is an inch or more in diameter. The difficulties arise from the fact that the relatively soft metal tends to flow or creep under pressure from a flaring tool and from the further fact that the metal is easily scored or galled. I have discovered that roller means of relatively small diameter inclined at the required flaring angle and moved in an orbit inside the tubing may be applied in such manner as to produce a flare of uniform thickness. I have discovered also that if such a roller is made of relatively hard non-corrosive material and is properly polished, the flared portion of the processed tubing will have the required smooth finish for an efficient tubing joint.

An additional object of my invention, then, is to provide a rotary flaring tool presenting a relatively small working diameter and having a highly polished working surface. A further object in the preferred form of my invention is to provide a device in which such a tool may be readily adjusted in its operation to various tubing diameters. More specifically, it is my object to provide an operating means for moving such a rotary tool in an orbit and to include an adjustable eccentric means for varying the orbit of the tool to accord with various tubing diameters. In the preferred form of my invention I further propose to add index means for indicating the adjustment of the device relative to the orbit of the rotary tool.

Other objects and advantages of my invention will be apparent in the following detailed description, considered with the accompanying drawings.

In the drawings:

Fig. 4 is an end view of the device taken as indicated by the arrow 4 in Fig. 2, the view showing the work holder in closed disposition;

Fig. 5 is a similar view with the work holder in open disposition, a portion of the device being broken away;

Fig. 6 is an axial section on an enlarged scale of the major portion of the device taken as indicated by the line 6—6 of Fig. 1;

Fig. 7 is a transverse section taken as indicated by the line 7—7 of Fig. 6; and Fig. 8 is an enlarged detail taken along the section indicated by the line 8—8 of Fig. 1.

Figure 1:
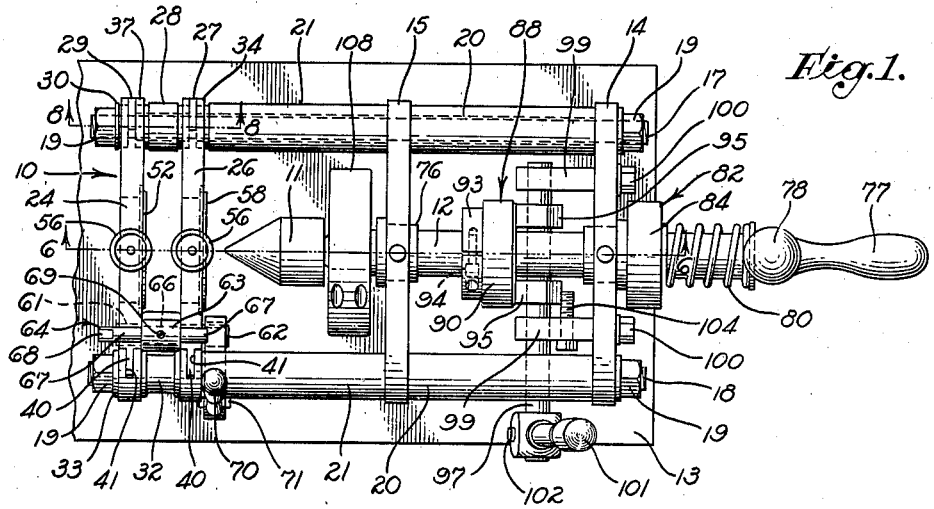
Fig. 1 is a plan view of the preferred form of my invention.

The device shown in the drawings includes a work holder generally designated 10, a flaring element or tool 11 and an operating shaft 12 that may be either power-driven or adapted for manual actuation. The framework in which the working parts are assembled may include, as shown, a base plate 13 and two transverse brackets 14 and 15 cut from relatively thick metal plate, the brackets being attached to the base plate by suitable bolts 16. To complete the framework the brackets are interconnected by a pair of longitudinal tie rods 17 and 18, each rod having a nut 19 on each of its ends. Spacer sleeves 20 are mounted on the two rods in compression between the two brackets 14 and 15 and similar spacer sleeves 21 are interposed between the bracket 15 and the work holder 10.

In the preferred form of my invention the work holder 10 comprises two spaced pairs of jaws including a lower jaw 23, a complementary upper jaw 24, a second lower jaw 25, and an upper jaw 26 complementary to the second lower jaw.

The lower jaw 25 is cut away to provide a relatively thin portion 27 that is apertured to receive the tie rod 17. As best shown in Fig. 8, the end portion 27 of the lower jaw 25 abuts the corresponding spacer sleeve 21 and also abuts a spacer sleeve 28 on the tie rod that extends toward the other lower jaw 23. The lower jaw 23 has a relatively thin end portion 29 embracing the tie rod 17 between the spacer sleeve 28 and an outer bushing 30, the outer bushing being in contact with the corresponding nut 19 on the end of the rod. The other ends of the two lower jaws 23 and 25 are apertured to receive the other tie rod 18, and as indicated in Fig. 1 a spacer sleeve 32 is interposed between the two lower jaws, the lower jaw 25 being held between the spacer sleeve 32 and the corresponding spacer sleeve 21, and the lower jaw 23 being confined by the spacer sleeve 32 and a suitable washer 33 that lies against the corresponding nut 19. Preferably the apertures in the two lower jaws and the tie rods 17 and 18 are dimensioned for close fit to insure rigidity.

Each of the upper jaws is pivotally mounted to swing about the tie rod 17 as an axis. As best indicated in Fig. 8 the upper jaw 26 is slotted to form a pair of hinge tongues 34 to straddle the end portion 27 of the lower jaw 25 and the two hinge tongues are apertured to be rotatively mounted on a reduced end portion 35 of the spacer sleeve 28 and on a reduced end portion 36 of the corresponding spacer sleeve 21. In similar manner the upper jaw 24 is slotted to form a pair of hinge tongues 37 that straddle the reduced end portion 29 of the lower jaw 23 and are apertured to rotate on a reduced end portion 38 of the spacer sleeve 28 and on the bushing 30.

It is apparent that the hinged ends of the upper jaws in the described arrangement interlock with the corresponding lower jaws in such manner as to insure rigidity of the upper jaws at their hinge points when the jaws are closed. Preferably the swinging ends of the upper jaws also interlock with the lower jaws when in closed disposition for further assurance of rigidity. For example, each of the upper jaws may be cut away to provide a tongue 40, the corresponding end of each of the lower jaws being cut away to provide a complementary slot 41.

One type of connector for thin-walled tubing of relatively large diameter employed in aircraft manufacture includes a connector sleeve that in use is engaged by a connector bushing. In the preferred form of my invention, I have the novel concept of using one of the pairs of jaws to embrace the connector sleeve and of using the other pair of jaws to grip the tubing behind the connector sleeve. One advantage in such a procedure is that the connector sleeve being stronger than the tubing may withstand considerable gripping force, and another advantage is that the connector sleeve may be employed as backing to cooperate with the rotary tool in the flaring operation. Fig. 6 shows a piece of tubing 44 embraced by a connector sleeve 45, the inner jaws 25 and 26 gripping the connector sleeve, and the outer jaws 23 and 24 gripping the tubing back of the connector sleeve.

Figure 3:
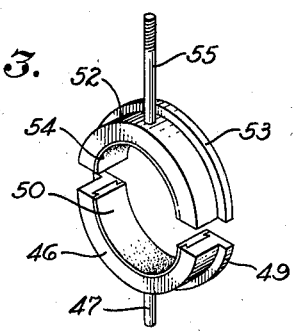
Fig. 3 is a perspective view on a somewhat enlarged scale of a pair of clamping inserts employed in the device.

In the preferred form of my invention, each of the two pairs of jaws is provided with replaceable gripping inserts whereby a graduated series of interchangeable inserts may be used to adapt the work holder 10 to tubing of various diameters. As best shown in Figs. 3 and 6, the lower jaw 23 has a semi-circular insert 46 that is held against rotation by a stud 47 extending radially from the insert into a complementary bore 48 in the lower jaw. To hold the insert against the thrust of the flaring tool, the insert has a radial flange 49 lying against one side of the jaw. Since the jaw 23 is applied directly against the tubing 44 and since tubing employed in aircraft is easily damaged or marred, I provide the insert 46 with a rubber or similar facing material 50. The complementary upper jaw 24 has a similar insert 52 that is flanged in the same manner and has a similar rubber facing 54. The upper insert 52 is attached to the jaw 24 and is also locked against rotation by an upwardly extending threaded stud 55 that is threaded into a knurled nut 56 at the top of the jaw.

The lower jaw 25 of the inner pair of jaws is provided with a removable insert 57 similar to the insert 46 but without rubber facing; and the upper jaw 26 has an insert 58 similar to the insert 52 but without rubber facing, the insert 58 being releasably retained as before described by a knurled nut 56.

Figure 2:
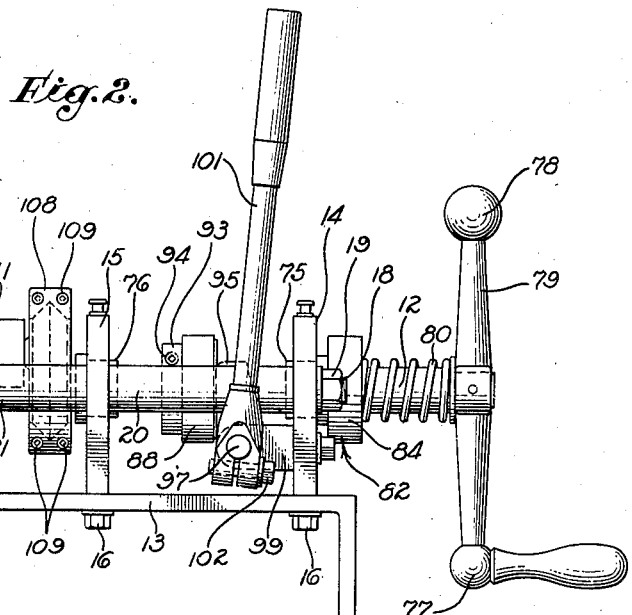
Fig. 2 is a side elevation.

Any suitable means may be employed to clamp the pairs of jaws shut to hold a piece of tubing, but in the preferred form of my invention I use a single clamping means for both pairs of jaws and incorporate in the clamping means adjustable compensation means for wear of working parts to maintain gripping efficiency. In the particular construction shown in the drawings, with special reference to Figs. 2, 4, and 5, a cylindrical body 60 between the two pairs of jaws has a trunnion 61 journaled in the lower jaw 23 and a longer trunnion 62 journaled in the lower jaw 25, the cylindrical body 60 being eccentric relative to the two trunnions. A link or clamp arm 63 that is pivotally mounted on the cylindrical body 60 extends upwardly between the two pairs of jaws and carries at its upper end a cross member 64 that is adapted to seat in a recess 65 in each of the upper jaws 24 and 26. To permit adjustment in compensation for wear, the cross member 64 may comprise a cylindrical body 66 journaled in the clamp arm 63 and two coaxial extensions 67 that are eccentric relative to the cylindrical body 66. One of the extensions 67 has a square end portion 68 to receive a wrench for adjustment and a setscrew 69 is threaded into the clamp arm 63 to hold the cross member at adjusted rotational position. The effective length of the link or clamp arm 63 relative to the cylindrical body 60 may be considered as the distance between the common axis of the extensions 67 and the axis of the cylindrical body 60 at the lower end of the link, and it is apparent that this effective length may be varied simply by rotating the cross member 64 from one set position to another.

The cylindrical body 60 may be controlled in its rotation by a clamp lever 70 keyed to the longer trunnion 62, the lever preferably having an angular configuration and the base plate 13 being cut away as indicated at 71 in Fig. 5 to permit the lever to swing downward to a relatively low position. In the lowermost position of the lever 70 the cylindrical body 60 is at a relatively high position in its orbit of motion and holds the clamp arm 63 high enough to permit the cross member 64 to clear the recesses 65 of the two upper jaws. When the clamp lever 70 is in its lower position, then the clamp arm 63 may be swung clear of the two upper jaws to permit the two upper jaws to be swung into open disposition as shown in Fig. 5. When the two jaws are subsequently closed against a piece of tubing in the work holder, the clamp arm 63 is swung into register with the recesses 65 of the upper jaws and then the clamp lever 70 is swung upward to the disposition shown in Fig. 4. The upward movement of the clamp lever shifts the cylindrical body 60 to a relatively low position in its orbit, thereby causing the clamp arm 63 to be moved downward to transmit gripping force to the two upper jaws. Preferably the parts are so arranged that the rotation of the trunnion 62 by the clamp lever 70 carries the cylindrical body 60 past the lowermost point of its orbit, in other words, past center, as the clamp lever 70 approaches its limit of movement against the spacer sleeve 21 on the tie rod 18, so that the clamping force exerted in tension through the clamp arm 63 tends to hold the clamp lever 70 in its uppermost position.

The operating shaft 12 is rotatably and slidably journaled in a bushing 75 in the bracket 14 and in a second bushing 76 in the bracket 15, and for manual actuation may carry at its outer end a crank 77, the crank being counterbalanced by a weight 78 on an arm 79. In the preferred form of my invention yielding means is provided to urge the shaft 12 continuously into retracted disposition relative to the work support 10, and for this purpose I may mount a helical spring 80 on the shaft between the crank 77 and the bracket 14. In the particular construction shown in the drawings, with special reference to Fig. 6, a collar thrust bearing 82 is interposed between the inner end of the spring 80 and the bracket 14. One collar 83 of this thrust bearing is carried by the bushing 75 and is provided with a cylindrical extension 84 that encloses a second collar 85, the second collar being mounted on the operating shaft and cooperating with the first collar to form a race for a series of balls 86.

The operating shaft 12 is also provided with a second and oppositely disposed collar thrust bearing 88 that includes a collar 89 with a cylindrical extension 90 and a second collar 91 within the cylindrical extension and forming with the collar 89 a race for an annular series of balls 92. The collar 89 rotates with the shaft 12 and is backed by a split ring 93 that is closed tightly around the shaft by a suitable setscrew 94. The second collar 91 under force exerted by the spring 80 through a shaft 12 presses against a pair of arms 95 that straddle the shaft 12 from below. The two arms 95 are mounted on a transverse rocker shaft 97, each of the arms being of relatively heavy plate material that is split and clamped to the rocker shaft by a cap screw 98. The rocker shaft 97 is journaled in a pair of horizontal brackets 99 that are secured to the framework bracket 14 by cap screws 100 and the rocker shaft is controlled by a manually operable lever 101 that is split and is clamped to the rocker shaft by a cap screw 102.

When the device is not in operation the normal position of the operating shaft 12 is in retracted disposition by virtue of the spring 80, the retraction of the shaft being limited by a suitable stop such as a bolt 104 (Fig. 1) extending from one of the brackets 99 into the path of one of the arms 95. The bolt 104, in limiting the movement of the arm 95, limits the rightward movement of the thrust bearing 88 as viewed in the drawings, and thereby stops the rightward or retraction movement of the shaft 12 at a predetermined point. When the lever 101 is swung counterclockwise, as viewed in the drawings, against the opposition of the spring 80, the two arms 95 force the operating shaft 12 longitudinally towards the work holder 10.

The tool or flaring element 11 is conical at its leading or working end and is mounted eccentrically on the operating shaft 12 to be moved in a circular orbit by rotation of the shaft. Preferably, the flaring tool 11 is adjustable with respect to its eccentricity so that the diameter of its circular orbit may be varied to conform with tubing of various diameters. The adjustable eccentricity of the tool mounting may be provided by various arrangements, but the construction shown in the drawings has outstanding advantages.

The leading or working end of the operating shaft 12 terminates in a transverse disc 105 integral therewith that is eccentric relative to the axis of the operating shaft. The tool holder for the flaring tool 11 is in the form of a second disc 107 that is complementary to the first disc 105 and is mounted thereon in face-to-face relation in some suitable manner providing for adjustable rotation of one disc relative to the other. In the particular construction shown, the two discs 105 and 107 are beveled and are normally gripped by a split clamping collar 108 that draws the two discs together by a wedging action, the collar being tightened by four setscrews 109. By loosening the setscrews 109 and applying a suitable spanner to a pair of spanner recesses 110 in the tool holder or disc 107, the operator may shift the rotational relationship of the two discs at will.

The tool holder 107 carries an eccentrically positioned stub shaft 113 that rotatively carries the flaring tool 11, a thrust bearing 114 and a pilot bearing 115 for the flaring tool being mounted on the stub shaft and housed by the flaring tool. Preferably, the eccentricity of the stub shaft 113 relative to the two discs 105 and 107 is approximately equal to the eccentricity of the two discs relative to the operating shaft 12 so that the adjustment of the two discs relative to each other may be at any relation ranging from one extreme in which the eccentricity of the stub shaft relative to the disc substantially cancels or offsets the eccentricity of the disc and the opposite extreme at which the two eccentricities are added together to determine the diameter of the orbit in which the flaring tool is moved. Such an arrangement permits the orbit of the flaring tool to approach zero diameter for flaring relatively small tubing or to be increased to a relatively large circle for flaring relatively large tubing.

If desired, an index may be provided to show at a glance the adjustment of the two discs 105 and 107 and to guide the operator in changing from one disc adjustment to another. For example, a pin 117 to serve as an index means or pointer may be mounted on the disc 105 to extend through an arcuate slot 118 in the outer disc 107 and the outer disc may be provided with a scale 119 to be read with reference to the pin. The scale 119 may either indicate the actual diameter of the tool orbit or may indicate the diameter of tubing for which a given tool orbit is suitable.

The operation of my invention may be readily understood from the foregoing description. It is apparent that the work holder 10 may be adjusted, by selecting the proper inserts, to hold in an efficient manner a tubing of any diameter within a wide range of diameters; and it is further apparent that the orbit of the flaring tool 11 may be adjusted within the same range of diameters. The tool orbit, of course, is slightly less than the internal diameter of the tubing to permit the conical point of the tool to engage the tubing rim from the inside.

After the tubing to be flared is properly mounted in the work holder 10 and the tool is properly adjusted to move in the required orbit, the operator turns the crank 77 with his right hand and simultaneously swings the lever 101 to the left to move the flaring tool progressively against the end of the tubing. The working portion of the flaring tool applied to the tubing is of relatively small diameter in my preferred practice. It is not necessary for the operator to have the skill of an expert to produce a properly dimensioned flare of uniform thickness and smooth finish.

The preferred form of my invention described herein in specific detail will suggest to those skilled in the art various changes, modifications, and substitutions that may be made without departing from the spirit of my invention; I reserve the right to all such changes, modifications, and substitutions that properly come within the scope of my appended claims.

I claim as my invention:

1. In a device for flaring the end of a tube carrying a connector sleeve, means to hold the tube for flaring and simultaneously to hold the sleeve on the tube against axial movement for backing the tube in the flaring operation, said holding means comprising: a base; two spaced pairs of jaws mounted on said base, one of said pairs of jaws being of a gripping diameter to clamp said sleeve, the other pair of jaws being of smaller gripping diameter to clamp said tube; a single arm pivoted to swing between said two pairs of jaws; means to place said arm in tension for creating gripping force in said pairs of jaws; and means to transmit said force laterally in opposite directions from said arm to said jaws with an equalizing tendency.

2. In a device for flaring the end of a tube carrying a connector sleeve, means to hold the tube for flaring and simultaneously to hold the sleeve on the tube against axial movement for backing the tube in the flaring operation, said holding means comprising: a base; two spaced pairs of jaws mounted on said base, one of said pairs of jaws being of larger gripping diameter to clamp said sleeve, the other pair of jaws having resilient gripping surfaces and being of smaller gripping diameter to clamp said tube; a cross-member dimensioned to span the space between said pairs of jaws and to contact the jaws for transmitting gripping force thereto; a tension link lying in a plane between said pairs of jaws to transmit force to said cross-member, said link carrying said cross-member and being attached thereto at an intermediate portion thereof whereby said cross-member tends to equalize the transmitted force between said pairs of jaws; an eccentric pivotally carrying said link; and operating means to rotate said eccentric for creating gripping force.

3. In a device for flaring the end of a tube carrying a connector sleeve, means to hold the tube for flaring and simultaneously to hold the sleeve on the tube against axial movement for backing the tube in the flaring operation, said holding means comprising: a base; a first pair of jaws with replaceable gripping portions, said pair of jaws being mounted on said base to grip said sleeve; a second pair of jaws with smaller replaceable gripping portions having resilient gripping surfaces, said second pair of jaws being mounted on said base in a position to grip said tube; a rotary body eccentrically carried by said base; an arm pivotally mounted on said body to swing between said two pairs of jaws; a cross-member adapted for engagement with said two pairs of jaws near its ends, said cross-member being attached at a portion intermediate its ends to said arm whereby it tends to equalize stresses from the arm between said pairs of jaws; and means to rotate said body thereby to transmit gripping force to said two pairs of jaws through said arm and said cross-member.

4. In a device for flaring the end of a tube carrying a connector sleeve with a peripheral shoulder, means to hold the tube for flaring and simultaneously to hold the sleeve on the tube against axial movement for backing in the flaring operation, said holding means comprising: a base; a first pair of jaws mounted on said base to grip said sleeve in abutment with said peripheral shoulder; a second pair of jaws with a smaller gripping diameter mounted on said base in a position to grip said tube adjacent said sleeve, said second pair of jaws having resilient gripping surfaces; a rotary body eccentrically carried by said base; an arm pivotally mounted on said body to swing between said two pairs of jaws; a cross-member mounted on said arm, said cross-member being rotatably adjustable and having portions eccentric to its axis of adjustment for engagement with said pairs of jaws; and an operating handle operatively connected with said eccentric rotary body to cause rotation thereof thereby to transmit gripping force to said two pairs of jaws through said arm and said cross-member.

JAMES M. PETTEY.